US009881377B2

(12) United States Patent
Mika et al.

(10) Patent No.: US 9,881,377 B2
(45) Date of Patent: Jan. 30, 2018

(54) APPARATUS AND METHOD FOR DETERMINING THE DISTINCT LOCATION OF AN IMAGE-RECORDING CAMERA

(71) Applicants: Thorsten Mika, Leighlingen (DE); Hendrik Fehlis, Bonn (DE)

(72) Inventors: Thorsten Mika, Leighlingen (DE); Hendrik Fehlis, Bonn (DE)

(*) Notice: Subject to any disclaimer, the term of this patent is extended or adjusted under 35 U.S.C. 154(b) by 91 days.

(21) Appl. No.: 14/419,262

(22) PCT Filed: Aug. 1, 2013

(86) PCT No.: PCT/EP2013/066175
§ 371 (c)(1),
(2) Date: Feb. 3, 2015

(87) PCT Pub. No.: WO2014/020108
PCT Pub. Date: Feb. 6, 2014

(65) Prior Publication Data
US 2015/0178928 A1  Jun. 25, 2015

(30) Foreign Application Priority Data
Aug. 3, 2012 (DE) .................. 10 2012 107 153

(51) Int. Cl.
G06T 7/00 (2017.01)
H04N 5/222 (2006.01)
(Continued)

(52) U.S. Cl.
CPC .............. G06T 7/0042 (2013.01); G06T 7/73 (2017.01); G06T 7/74 (2017.01); G06T 7/80 (2017.01);
(Continued)

(58) Field of Classification Search
CPC ... G06T 7/0042; G06T 7/0018; G06T 7/0044; G06T 2207/10004; G06T 2207/30204;
(Continued)

(56) References Cited

U.S. PATENT DOCUMENTS 5,754,230 A  5/1998 Tsuruta
6,556,722 B1  4/2003 Russell et al.
(Continued)

FOREIGN PATENT DOCUMENTS

DE  10051415 A1  4/2002
EP  0909100 B1  4/1999
(Continued)

OTHER PUBLICATIONS

Koser, K., Bartczak, B. & Koch, R. "Robust GPU-assisted camera tracking using free-form surface models", J Real-Time Image Proc (2007) 2: 133. doi:10.1007/s11554-007-0039-8.*
(Continued)

Primary Examiner — Sath V Perungavoor
Assistant Examiner — Howard D Brown, Jr.
(74) Attorney, Agent, or Firm — Cantor Colburn LLP

(57) ABSTRACT

An apparatus and method for determining the distinct location of an image-recording camera within an environment, using visually detectable structures includes the image-recording camera, a measuring camera permanently mounted thereon, and an evaluation unit configured to ascertain the distinct location of the image-recording camera from the measuring camera image structures. The two cameras are oriented to record a common detail from the environment, containing structures that are visually detectable by the two cameras in their images. The measuring camera is connected to the evaluation unit, which is designed to ascertain the distinct location of the image-recording camera from the environment structures detected
(Continued)

Figure 1:
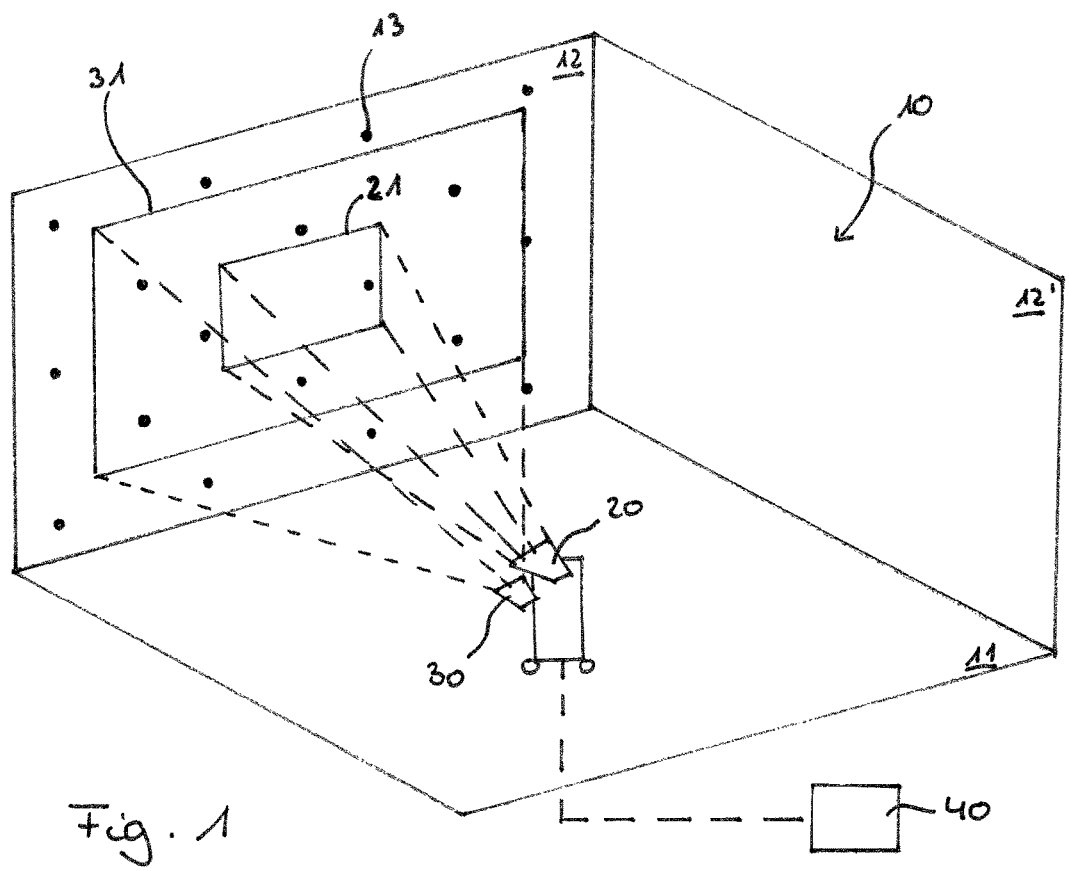

by the measuring camera. The evaluation unit is configured to locate these structures in the image-recording camera image and to correct the location of the image-recording camera, ascertained from the measuring camera image, using the position of the structures from the image-recording camera image.

11 Claims, 1 Drawing Sheet

(51) Int. Cl.
*G06T 7/80* (2017.01)
*G06T 7/73* (2017.01)
*H04N 5/247* (2006.01)

(52) U.S. Cl.
CPC . *H04N 5/2224* (2013.01); *G06T 2207/10004* (2013.01); *G06T 2207/30204* (2013.01); *G06T 2207/30244* (2013.01); *H04N 5/247* (2013.01)

(58) Field of Classification Search
CPC ........ G06T 2207/30244; H04N 5/2224; H04N 5/247
See application file for complete search history.

(56) References Cited

U.S. PATENT DOCUMENTS

| | | | |
|---|---|---|---|
| 2006/0177101 A1* | 8/2006 | Kato | G01C 11/02 382/106 |
| 2007/0183770 A1* | 8/2007 | Aoki | H04N 7/181 396/428 |
| 2008/0259162 A1* | 10/2008 | Aoki | G06K 9/32 348/159 |
| 2010/0245593 A1* | 9/2010 | Kim | H04N 5/222 348/188 |
| 2013/0193855 A1* | 8/2013 | Bauer | G01C 11/02 315/151 |
| 2014/0085428 A1* | 3/2014 | Stahlin | G01C 3/06 348/46 |

FOREIGN PATENT DOCUMENTS

| | | |
|---|---|---|
| EP | 1594322 A2 | 11/2005 |
| EP | 1901029 A2 | 3/2008 |
| GB | 2324429 A | 10/1998 |
| GB | 2325807 A | 12/1998 |
| GB | 2329292 A | 3/1999 |

OTHER PUBLICATIONS

J. Chandaria et al. "The MATRIS project: Real-time markerless camera tracking for Augmented Reality and broadcast applications", Journal of Real-Time Image Processing; Nov. 1, 2007, vol. 2, No. 2-3, pp. 69-79, XP007907937.*
International Search Report dated Oct. 10, 2013 re: Application No. PCT/EP2013/066175; citing: J. Chandaria et al. "The MATRIS project . . . "; US 2010/245593 A1.
Written Opinion dated Oct. 10, 2013 re: Application No. PCT/EP2013/066175; pp. 9; citing: J. Chandaria et al. "The MATRIS project . . . "; US 2010/245593 A1.

* cited by examiner

APPARATUS AND METHOD FOR DETERMINING THE DISTINCT LOCATION OF AN IMAGE-RECORDING CAMERA

FIELD

The disclosure relates to a device for determining the own position of an image-recording camera within an environment in which structures are optically detectable, wherein the image-recording camera, a measuring camera firmly mounted to this camera in a known position and an evaluation unit are configured to determine the own position of the image-recording camera at least from the structures in the image of the measuring camera.

A determination of the own position of an image camera within a space is required particularly in the case of "Virtual Studio" television productions in order to superimpose a virtual scene upon a real scene that the image camera records from the studio. The exact position and orientation of the image camera must be known so that the virtual scene can be calculated or superimposed upon the real scene in such a manner that there is a correct match between the real and virtual elements.

BACKGROUND

Various approaches are known in order to be able to determine as exactly as possible this own position of a recording camera. For example, patent specification EP 0 909 100 B1 discloses the determination of the own position of a recording television camera directly from the image of that television camera. In the process, points of a special pattern within a virtual studio are used, as well as virtual objects.

However, patterns in the image of the recording camera often may not suffice to reliably determine the own position of that camera in every situation. This may be the case particularly in zooming situations, in which only few or no measuring points at all are visible outside of the zoomed-in object. Thus, the patent application GB 2 329 292 A, for example, proposes to provide the recording camera with an additional measuring camera that recognizes LEDs in the scene.

The position of these LEDs was measured in advance, so that the measuring camera's own position can thus be determined. The associated television camera's own position can then be indirectly determined from this, because the position of the measuring camera with respect to the television camera is fixed and known.

The patent application GB 2 325 807 A, for example, also discloses a system in which a recording camera is provided with an auxiliary camera orientated in the direction of the ceiling of the studio in order to recognize patterns on the ceiling. From this, the auxiliary camera's own position can again be determined, and thus indirectly also the recording camera's own position.

Furthermore, it is known from the patent application EP 1 594 322 A2 to determine a camera's own position without any additional markers or patterns in the studio, with, however, a plurality of reference images of the scene being recorded in different camera positions and stored prior to the recording. During the actual recording by the camera, these reference images can then be used and compared with the currently recorded images in order thus to determine the respective own position of the camera.

Moreover, sensors on the camera can be used in order to detect movements of the camera and thus draw conclusions as to the changed own position of the camera or to support a different determination of the own position. In the case of cameras with a fixed focal length, it is also known to determine the camera's own position based on known points, markings, patterns etc, wherein 2D and 3D patterns can be used.

In particular, the results of a calculation of position with an additional measuring camera and markers in space, however, depend to a great extent on the quality of the measuring camera. Usually, large aperture angles have to be used in the process, so that the camera sees much of the scene to be recorded and is able to detect as many marking points as possible despite various obstacles. However, a large aperture angle means a lower spatial resolution, so that the calculations may thus be very noisy and insufficiently exact. Especially in the field of television, however, imaging cameras with a very long focal length are often used in order to be able to zoom in very closely on objects. The longer the focal length, the more likely is it that noise or displacement of the virtual objects due to an insufficiently exact calculation of the position of the virtual images becomes visible, which is very disadvantageous, so that methods of this type can be used only to a very limited extent in the field of television.

SUMMARY

It is therefore disclosed to provide an improved device and an improved method for determining the own position of an image-recording camera in order to be able to generate as low-noise and exactly placed virtual images as possible, for example in a chromakey process, wherein the device and the method are to be suited particularly for the field of television and film.

According to the disclosure, this object is achieved by means of a device according to the independent claim 1. Advantageous embodiments of the device are apparent from the dependent claims 2-7. Moreover, the object is achieved by means of a method according to claim 8. Advantageous embodiments of the method are apparent from the dependent claims 9-11.

The device according to the disclosure is suitable for the determination of the own position of an image-recording camera within an environment in which structures are optically detectable, wherein the determination of the own position can include the determination of the position of the camera in the x-, y- and z-coordinate and/or its orientation in space. The orientation is determined, for example, by parameters such as the pan, tilt and/or roll angle. Preferably, both the position and the orientation of the image-recording camera are determined; however, the disclosure is not limited to this complete determination of the own position of the camera in the environment, but the advantages of the disclosure can also be used separately for the determination of the position or the determination of the orientation.

The device according to the disclosure comprises at least the image-recording camera, a measuring camera firmly mounted to this camera in a known position and an evaluation unit, which is configured to determine the own position of the image-recording camera at least from the structures in the image of the measuring camera. According to the disclosure, it is provided that the image-recording camera and the measuring camera are orientated in such a way in the process that they are able to record at least partially a common section of the environment within which structures are located that are optically detectable by both cameras in their images, respectively. The two cameras can thus see, at least in sections, the same image and thus the same optically detectable structures.

Further, the measuring camera is connected to the evaluation unit, which is configured to continuously determine the own position of the image-recording camera at least from the structures in space that are respectively detected by the measuring camera in its image. If the own position of the image-recording camera changes during a recording, the positions of optically detectable structures in the current image of the measuring camera also change, from which the changing own position of the image-recording camera can be calculated. The evaluation unit is further configured for locating these structures at least partially also in the image of the image-recording camera and for correcting the own position of the image-recording camera, which is determined from the image of the measuring camera, based on the position of the structures determined from the image of the image-recording camera.

The evaluation unit thus continuously searches, in the image of the image-recording camera, for the structures detected in the current image of the measuring camera in order thus to correct the determination of the own position of the image-recording camera, wherein parameters of the own position, such as the pan, tilt and/or roll angle can be determined more exactly. However, the term "correct" within the sense of this disclosure does not necessarily means that the own position of the image-recording camera is thus determined with more physical accuracy. The disclosure does not strive for as exact a physical calculation as possible of the own position of the measuring camera or of the image-recording camera in space, but rather for the best match between the real and the virtual images (best match). This is achieved by using the image of the image-recording camera because the virtual elements have to be inserted into precisely that image at the right locations. Whether or not the own position of the image-recording camera in space was therefore calculated exactly or not is irrelevant as long as the virtual elements are located at the right positions on real markers. To achieve this, the determination of the own position of the image-recording camera is refined accordingly, i.e. it is determined in such a way that as good a match as possible between the real and the virtual images is provided.

Here, the evaluation unit can be configured to first determine the own position of the measuring camera, with parameters of this own position, such as the pan, tilt and/or roll angle being determined also in this case. Then, the current own position of the image-recording camera can be determined from the known position of the measuring camera relative to the image-recording camera. However, this does not have to take place in steps, but the disclosure rather also comprises embodiments in which the parameters of the own position of the image-recording camera can be calculated directly from the structures detected in the image of the measuring camera via a corresponding algorithm.

Therefore, the basic principle of the disclosure provides to carry out the changing own position of the image-recording camera in space indirectly via the determination of the own position of the additional measuring camera, because the fixed position of the measuring camera relative to the image-recording camera is known and does not change in case of the image-recording camera moving during recordings. In turn, the changing own position of the measuring camera in space is continuously determined from its image, with the image of the image-recording camera preferably also being used continuously to correct parameters of the own position. Thus, these parameters are first determined based on the image of the measuring camera, but once the image of the image-recording camera is used by the evaluation unit, the parameters can be determined more exactly and, if necessary, corrected. A more exact determination of the own position of the image-recording camera can thus be achieved than would be possible only with the image of the measuring camera. In turn, this has a positive effect on the quality of the matching of the real to the virtual images.

In this case, this subsequent adjustment can relate to individual or to all parameters, and the subsequent adjustment is based upon a comparison of the screen positions of the virtual objects that were calculated by means of the measured values of the measuring camera to the actual screen coordinates of the markers in the images of the image-recording camera. If these screen positions deviate from each other, the individual parameters are changed until the two image positions match.

Compared with solutions such as, for example, that from EP 1 594 322 A2, the disclosure is advantageous in that an additional camera with a large aperture angle is not used for preparing reference images with which the image of the image-recording camera is merely compared in order to determine therefrom the own position of the image-recording camera, but rather, the additional camera is directly used for determining the own position of the camera. Thus, the effort for the installation and thus the preparation of a recording is considerably smaller in the case of the disclosure. Moreover, no attempt is made to find the entire scene recorded by the image-recording camera in the reference images; rather, only a single point is sought in the image of the image-recording camera in extreme cases. This makes a faster calculation possible and requires a smaller computing capacity for carrying out the calculation.

Furthermore, the quality of the matching of the real to the virtual images will also be better in the case of the disclosure than in this known method, depending on the kind of optically detectable structures used. This is the case particularly if predefined patterns in space are used, because the known method carries out an estimate based only on the natural scene and calculates the best possible result from this. Further, no attempt is made according to the disclosure to carry out the same process with the image-recording camera as with a measuring camera; rather, the process of the measuring camera is only refined. The advantages of the process according to the disclosure then become particularly clear especially in the case of recordings that are zoomed-in close (long focal lengths, small aperture angles).

In the process, the evaluation unit preferably has access to stored information relating to the position of the optically detectable structures within the space and is configured to indirectly determine the own position of the image-recording camera, too, at least from the respectively known position of the structures in space detected by the measuring camera in its image. This information relating to the position of the optically detectable structures within the space can be determined once prior to installation, whereby their three-dimensional coordinates are known. The measuring camera then sees the optical structures in its image and the evaluation unit can identify individual structures and associate them with the known coordinates. The measuring camera's own position can be calculated from this at first. From the known position of the measuring camera relative to the image-recording camera, conclusions can also be drawn, indirectly, as to the own position of the image-recording camera in space.

However, the three-dimensional coordinates of optically detectable structures in space do not necessarily have to be determined prior to installation; rather, methods can also be used which calculate them in an unknown scene from a sequence of images.

The own position of the image-recording camera thus determined can then be used to superimpose the real images of the camera at certain locations of the recorded space exactly with those virtual images that correspond to the view of the camera onto these locations. A chromakey and/or matting method can be used as a mixing technique for this purpose.

In order to determine the position of the measuring camera from structures optically detected in its image, various suitable methods can be used that are known to the person skilled in the art and are not explained in detail here. However, such methods can be carried out particularly easily if the measuring camera used has a fixed focal length, which can be determined, for example in advance, by a separate calibration or measurement. In one exemplary embodiment of the disclosure, the measuring camera therefore has a fixed focal length and preferably a larger aperture angle than the image-recording camera.

For example, the aperture angle of the measuring camera can have an order of magnitude of 80 to 180 degrees, with this being the horizontal aperture angle (Field of View—FoV) at which the measuring camera sees the scene, i.e. the section from the overall system. Since the lenses in the film and television field are usually between 55 and 90 degrees, the measuring camera should have an aperture angle of at least that size. Typical lenses can have an aperture angle of around 90 degrees; however, so-called Fisheyes with aperture angles of 120, 160 or even 180 degrees could also be used. Lenses that cover the entire 360 degrees via a cone-shaped mirror could also be used.

Due to the large aperture angle of the measuring camera, the latter can see much of the scene in the space and enough structures, even despite possible obstacles. Due to the smaller aperture angle of the image-recording camera, the image-recording camera sees a smaller section of the scene than the measuring camera, wherein the common section that both cameras see can then correspond to the image of the image-recording camera. For example, the zoom in the case of wide-angle zoom lenses could be adjustable between 10 and 90 degrees, or in the case of zoom lenses with a normal focal length between 1 and 60 degrees. In the case of a fixed focal length, aperture angles of 0.2 to 120 may occur.

However, due to the larger aperture angle of the measuring camera, its spatial resolution is poorer, i.e. the number of pixels of the measuring camera per meter in space is lower, which results in very noisy calculations without the process according to the disclosure for smoothening or re-calculation. In contrast, the spatial resolution of the image-recording camera is higher.

Due to its large aperture angle, the measuring camera thus always provides enough points for calculating all parameters, whereas the image-recording camera sees fewer measuring points, but, in exchange, has a better resolution and is able to refine the image of the measuring camera at least in some portions or to determine individual parameters more exactly. The image-recording camera preferably has a fixed or changing focal length, with very large aperture angles in the range of 0.5 to 70 degrees being used for the image-recording camera particularly in the field of television in order to zoom in objects very closely, if possible. The longer the focal length, i.e. the smaller the aperture angle of the image-recording camera, the more likely it is that noise or an inaccurate calculation of the location of the virtual images becomes visible.

Particularly if the image-recording camera has a changing focal length, the zoom lens of the image-recording camera is preferably calibrated in such a way that all possible aperture angles over the entire setting range of the zoom and the focus are known, with the evaluation unit having access to information relating to the stored aperture angles.

The determination of the own position of the measuring camera and thus of the image-recording camera can be corrected according to the disclosure by the image of the image-recording camera being used that sees at least partially the same section of the space as the measuring camera. The rough position of optically detectable structures is already known from the image of the measuring camera, and these structures can now be sought in the high-resolution image of the image-recording camera in order to determine from this the calculated position of the image-recording camera more exactly. With this information, the result of the calculation regarding the own position of the measuring camera is smoothened or partially or completely re-calculated in order to again determine from this the own position of the image-recording camera.

Since the respectively selected mixing technique (compositing) is then carried out with the image of the image-recording camera, no noise or shaking of the superimposed virtual elements must be visible in its image. To avoid this, the resolution of the measuring camera should therefore actually be just as good as the resolution of the image-recording camera. If the image-recording camera zooms in, the real objects are enlarged to a greater extent, and the measuring camera should actually also provide better data. However, the quality of the measuring camera always remains the same.

The approach according to the disclosure of using the image of the image-recording camera for correcting parameters of the determined own position in this case is advantageous in that the spatial resolution of this image becomes ever better the more the image-recording camera zooms in. The quality of the smoothening or re-calculation by the image-recording camera thus always adapts to the required resolution, and the resolution of the image of the image-recording camera in pixels is the exact resolution required for the mixing effect of the chromakey process. Thus, the accuracy of the overall system is scalable and always as good as the mixing effect requires.

Only the resolution of the image-recording camera is in this case the decisive factor for the mixing of the real images with the virtual images, because only here is the image supposed to look good as a result. In the end, a virtual element such as an object or scene is supposed to be inserted into the image of the image-recording camera, so that the virtual element has to fit the real image in a pixel-accurate manner.

However, the structures in the image of the image-recording camera always have the right position in the image so that they can be used optimally for improving the calculation of position. However, only few structures at a time can be seen, so that the approach according to the disclosure, namely to incorporate the image-recording camera into the measurement by means of a measuring camera, is advantageous. The measuring camera carries out a continuous calculation of position, which may be relatively imprecise, but in exchange always has a sufficient amount of measuring points. The image-recording camera always sees very few measuring points, so that a continuous calculation of position from these points would not be reliable, but the few points that are seen can be used well for improving the calculation of the own position of the measuring camera and thus indirectly also of the image-recording camera, because the latter provides a very high-resolution image.

However, the structures (measuring points) do not have to be identified first in the image of the image-recording camera as is the case in other methods, in which the own position is directly determined from the image of the image-recording camera, because this results in inaccurate calculations in the case of few visible measuring points in the image of the image-recording camera. Rather, the identification of the measuring points is already known through the measuring camera so that they can be specifically sought in the image of the image-recording camera. Even if the image of the image-recording camera provides no measuring points, for example because all measuring points are obscured or blurred, the measuring camera can still provide data for a determination of the own position of the two cameras.

Chromakey and/or matting methods can be used as a mixing technique. In the chromakey method, virtual objects/images are inserted at those locations that are colored blue or green in the scene, whereas the virtual objects/images are laid over the real image in the matting method.

The optically detectable structures within an environment can be various elements. For example, optically detectable structures can be markings applied in a defined manner that are characterized by color, brightness and/or shape. These types of markings are then specifically arranged at certain positions, wherein the disclosure can be used within a space, but also in an open environment.

A characterization by their color may be given, for example, if certain markings are distinct from a green or blue background of a virtual studio due to their color. However, they can also be distinct from a background due to their shape, wherein the shape can vary, and circular, elliptical, angular and/or line-shaped structures can be used in both variations. In this case, the markings can be arranged arbitrarily or in defined patterns.

In addition or as an alternative to the markings applied in a defined manner, optically detectable structures can also be formed by naturally present parts of the environment or of a space. For example, they can be any edges and/or points of intersection of edges that are created by fixtures or furniture within a space. In the free environment, such edges and/or points of intersection are provided by houses, streets or even landscapes. Thus, the optically detectable structures are generally distinctive points from whose position within an image conclusions can be drawn as to the position in space of the respective camera.

The disclosure further comprises a method for determining the own position of an image-recording camera within an environment in which structures are optically detectable, wherein an evaluation unit calculates the own position of the image-recording camera at least from structures in the image of a measuring camera that is firmly mounted in a known relative position to the image-recording camera. According to the disclosure, the image-recording camera and the measuring camera are orientated in such a way for this purpose that they record at least partially a common section of the environment within which structures are located that are optically detected by both cameras in one image, respectively. The measuring camera then transmits data relating to its image to the evaluation unit, which determines the own position of the image-recording camera at least from the structures in the environment that are detected by the measuring camera in its image. In the process, the evaluation unit locates these structures at least partially also in the image of the image-recording camera and corrects the own position of the image-recording camera, which is determined from the image of the measuring camera, based on the position of the structures determined from the image of the image-recording camera.

This is a method that is continuously carried out in the case of recordings with the image-recording camera, in order to be able to also continuously calculate the own position of the image-recording camera. Thus, a change of the own position of the image-recording camera results in a changed image of the measuring camera because the latter moves along analogously. The structures detected in this image are continuously sought also in the image of the image-recording camera, and with the more exact position of the structures in the image of the image-recording camera thus determined, the determination of the own position of the measuring camera, and thus indirectly also of the image-recording camera, can be continuously corrected.

In this case, the method is preferably carried out in real time, i.e. the video images of the cameras are not first recorded and then subjected in total to the calculation, but a complete calculation is carried out after each individual video image and the result of the own position is calculated. This takes about 10 ms and is advantageous particularly for applying the disclosure in the field of television because here, virtual objects must be calculated and inserted live for each image. At present, either 50 or approximately 60 fields are used in television, so that the result of the calculation should be available within 20 or 16.6 ms, which is possible with the disclosure. In this case, the measuring camera used has to work with the corresponding frequency, and the algorithm must be sufficiently fast.

Also in the method, the evaluation unit calculates the own position of the image-recording camera preferably by accessing stored information relating to the position of the structures that are detected in the image of the measuring camera. Further, it is provided in a preferred exemplary embodiment of the method that the evaluation unit corrects the determined own position of the measuring camera by searching in the image of the measuring camera for optically detectable structures, identifying them and carrying out an estimate of the position of the detected structures. Thereupon, the evaluation unit calculates in the image of the image-recording camera a probable position of the detected structures, searches for them at this probable position in the image of the image-recording camera and determines their actual position in the image of the image-recording camera. The determined actual position of the structures in the image of the image-recording camera is then used by the evaluation unit to re-calculate the own position of the image-recording camera.

In this case, it may be provided that the evaluation unit smoothens or re-calculates the image of the measuring camera based on the position of the structures determined from the image of the image-recording camera. The evaluation unit can, for example, smoothen or improve the image of the measuring camera by using the determined actual position of the structures in the image of the image-recording camera to re-calculate the position of the structures in the image of the measuring camera.

Expediently, the fixed position of the measuring camera relative to the image-recording camera is calibrated prior to the determination of the own position of the image-recording camera. This may take place, for example, by the two cameras recording the same image with the same structures in space during calibration. In one exemplary embodiment of the disclosure, both cameras record the same image with the same structures in space more than once without the cameras being moved in the process. An average result of the calculation can then be used to determine the position of the measuring camera relative to the image-recording camera.

BRIEF DESCRIPTION

Figure 2:
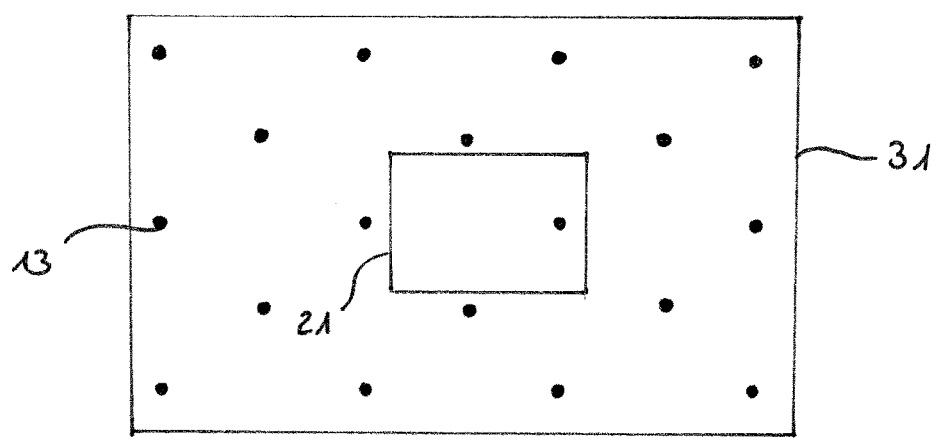

In the Figures:

FIG. 1 shows a schematic representation of an exemplary embodiment of the device according to the disclosure within a space; and FIG. 2 shows a comparison of the optically detectable structures within the images of the image-recording camera and the measuring camera.

DETAILED DESCRIPTION

FIG. 1 schematically shows a space 10 within which an image-recording camera 20 is located that records images of the space 10. The image-recording camera 20 is a camera whose real images of a scene within a space 10 are superimposed with virtual images while a chromakey process, for example, is carried out. This camera can also be referred to as imaging camera.

The associated space 10 can be, in particular, a virtual television studio which is suitable for carrying out a chromakey process due to its coloring. However, the disclosure is not limited to the application in television studios, but may also be used, for example, in film studios or other environments. An application outdoors is also possible, so that the term "space" in the sense of this disclosure is not limited to enclosed spaces for example in buildings. Outdoors, the natural structures of the environment that are optically detectable are then used for a calculation of the position of a camera.

The space has a floor surface 11 and several side walls, with only two rear side walls 12 and 12' being depicted in the schematic view of FIG. 1. The walls and the floor of the studio can be painted blue or green so that the respective color in these regions can be exchanged for virtual images.

The image-recording camera 20 is directed towards a rear side wall 12, for example, and thus records an image 21 of the side wall and the bodies located in front of it, which, however, are not shown in order to simplify the illustration in FIG. 1. In this case, the image-recording camera 20 can be rotatable at least about the vertical z-axis, which corresponds to a horizontal pan. Moreover, it can be inclined about a horizontal axis, which corresponds to a vertical tilt. A rotation about the optical axis (roll) may also be possible.

Moreover, the camera 20 can be firmly mounted in space 10 at least in the horizontal x- and y-direction; preferably, however, it is configured to be movable also in these axes, because particularly in the case of a camera that is freely movable in the space 10, the determination of the respective position and orientation is essential for the chromakey method used, in which the images recorded by the image-recording camera 20 are superimposed with virtual images. However, the disclosure can also be used in the case of cameras which are not configured to be movable in all axes in space.

A measuring camera 30 whose position relative to the image-recording camera 20 is fixed and thus known is attached to the image-recording camera 20. In this case, the measuring camera 30 can be directly connected to the image-recording camera 20, or the two cameras are mounted to a common holding means. In this case, the measuring camera 30 is preferably attached to the image-recording camera 20 below or next to it and very close to it, carrying out every movement of the image-recording camera 20 together with it.

According to the disclosure, the two cameras 20, 30 are aligned in such a way that they are able to at least partially record a common section of the space 10. In the exemplary embodiment shown, the measuring camera 30 is thus also directed towards the rear side wall 12 and records an image 31 of that wall together with bodies located in front of it (not shown). In this case, the aperture angle of the measuring camera 30 is larger than the aperture angle of the image-recording camera 20, so that the image 21 of the image-recording camera 20 merely depicts a section from the image 31 of the measuring camera 30.

Structures that are optically detectable by the two cameras 20, 30 are present within the space 10. They can be any structures that are optically detectable in the image of the cameras 20, 30 due to their shape and/or coloring. For example, markings 13 that are distributed arbitrarily or form predefined patterns can be attached at least to the side walls 12, 12', but also on the floor 11 or on a ceiling that is not shown. But also three-dimensional shapes such as corners and edges of objects can be considered to be structures in the sense of this disclosure because the position and orientation of cameras can also be determined from them. In both cases they may be specially attached markings or natural objects that would be present in the space 10 in any case.

In order to be able to determine the position of the measuring camera 30 relative to the image-recording camera 20 after the measuring camera 30 was attached to the image-recording camera 20, a calibration/measurement of this position can be carried out. This can take place in various manners, with an optical calibration, in particular, having proved advantageous in which the two cameras 20, 30 see, in a wide-angle setting, the same pattern and their position is calculated multiple times from this. For example, about one hundred calculations can be carried out without the two cameras 20, 30 being moved in this time. An average result of the calculation of position can then be used to determine the position of the measuring camera 30 relative to the image-recording camera 20.

Preferably, the internal or optical parameters of the measuring camera 30 are also included in this calibration, these being the focal length, the distortion, the image center etc. Furthermore, the optical properties of the image-recording camera 20 are also calibrated, which may include, in particular, the focal length, the distortion, the center etc. of the lens.

The optical detectable structures in the exemplary embodiment shown in FIG. 1 are markings 13 that are applied in a certain pattern at least on the side wall 12. In a simple form, the markings 13 are configured to be circular, and the three-dimensional coordinates of each marking are known. These coordinates can be measured once during the installation of the device, so that an identification (ID) and the associated three-dimensional coordinates can be assigned to each marking.

These data are stored in an evaluation unit connected to the measuring camera 30 and the image-recording camera 20. In FIG. 1, this is schematically illustrated by a component 40 which is located apart from the camera 20, 30 and that is also able to carry out the chromakey method for generating the resulting final image consisting of the real image and the superimposed virtual elements.

In this case the markings 13, which are selected by way of example, form several rows of points arranged offset relative to one another, for example, but patterns that are encoded in a less complicated manner can also be used. For example, several points can be unified into a cluster which can then be identified based on a pronounced feature. Moreover, other forms of markings such as rectangles, concentric circles, crossing lines etc. can also be used.

Several of these markings 13 whose coordinates are known appear in the image 31 of the measuring camera 30, from which the evaluation unit 40 connected to the measuring camera 30 can calculate the own position of the measuring camera 30. In the process, the measuring camera 30 sees the markings 13 and the evaluation unit 40 identifies them and associates them with the known coordinates, which is why the markings 13 can also be referred to as measuring points. From the identified measuring point 13, the own position of the measuring camera 30 can then be calculated, which may include parameters for its position in space (x, y and z-axis) and its orientation (pan, tilt and roll angle), because the 2D screen coordinates correspond to a 3D position in space of the measuring camera 30. Since the position of the measuring camera 30 relative to the image-recording camera 20 is fixed and known, the own position of the image-recording camera 20 can be calculated from the own position of the measuring camera 30.

FIG. 2 shows the two images 21 and 31 of the image-recording camera 20 and the measuring camera 30, with the image 21 of the image-recording camera 20 being smaller than the image 31 of the measuring camera 30 due to its smaller aperture angle. The image 21 of the image-recording camera 20 thus constitutes the common section of the space 10 that the cameras 20, 30 both see due to their orientation, with fewer measuring points 13 being visible within the image 31 of the measuring camera 30 than in the image 21 of the image-recording camera 20.

From the identified measuring points in the larger image 31 of the measuring camera 30, the position of the measuring camera 30 can be calculated in a first estimate, which can be supplemented with the information on how the measuring camera 30 is arranged relative to the image-recording camera 20. From this, a first estimate for the own position of the image-recording camera 20 in the space 10 can already be calculated. In this case, the measuring camera 30, due to its large aperture angle, always provides enough measuring points in order to calculate all parameters.

The identified measuring points in the image 31 of the measuring camera can now be used to find them, at least partially, also in the higher-resolution image 21 of the image-recording camera 20 by a theoretical position of the measuring points being calculated in this image 21. It is then determined in the image 21 of the image-recording camera 20, in the vicinity of these theoretical position, whether the points concerned are actually located there. The discrepancy thus determined between the position of the measuring points in the image 31 of the measuring camera 30 and in the sharper image 21 of the image-recording camera 20 can be used to carry out an improvement of the first estimate of the own position of the measuring camera 30, and thus of the image-recording camera 20.

Even given only a single measuring point that is located in the image 21 of the image-recording camera 20 and whose position can be determined more exactly in the image 31 of the measuring camera 30 with this procedure, two parameters could already be readjusted, i.e. the first estimate of the measuring camera 30 or of the image-recording camera 20 in the space 10 can be improved. In the process, a horizontal pan of the camera and a vertical pan or tilt of the camera, for example, can be determined more exactly. Even if these parameters are then physically still not 100% correct or accurate, the result in the final image in any case looks better because the points fit the actual positions in the image better, i.e., they "match" better.

If two measuring points are already visible in the image 21 of the image-recording camera 20, and if their position can be determined more accurately than by means of the image 31 of the measuring camera 30, a rotation about the optical axis (roll) can additionally be determined more exactly. The focal length, i.e. the size of the image or the picture could be determined more exactly.

If three measuring points are visible in the image 21 of the image-recording camera 20, and if their position can be determined more accurately than by means of the image 31 of the measuring camera 30, both axes perpendicular to the optical axis can additionally be determined more exactly. Starting from four measuring points, all parameters could be corrected subsequently.

In this case, the image of the measuring camera 30 can be smoothened due to the additional information on the actual position of the structures in the image 21 of the image-recording camera 20. The data are thus stabilized and the image of the measuring camera is thus steadier relative to the camera image. With the smoothened image of the measuring camera 30, the calculations for the own position could then be carried out again. In one exemplary embodiment of the disclosure, the image 21 of the image-recording camera 20 is not only used for smoothening the image 31 of the measuring camera 30, but it can also be used directly for the calculation of position in a first step. A more stable 3D model can thus be prepared.

Moreover, data from other sources or calculation methods can be included in the calculation of position. In particular, inertial sensors such as gyroscopes and acceleration sensors can be used in order to improve the determination of the own position of the cameras. These sensors are attached to the image-recording camera 20 and the measuring camera 30 and register the movement of the two cameras 20, 30 using the respective effective mechanisms of the sensors.

The invention claimed is:

1. A device for determining an own position of an image-recording camera within an environment in which a plurality of structures are optically detectable, the device comprising: at least the image-recording camera, a measuring camera firmly mounted thereto in a known position and an evaluation unit, which is configured to determine an own position of the image-recording camera at least from the structures in a first image of the measuring camera, wherein the image-recording camera and the measuring camera are orientated such that they record at least partially a common section of the environment within which the structures are located are optically detectable by the image-recording camera in a first image and the measuring camera in a second image, and that the measuring camera is in connection with the evaluation unit, which is configured to continuously determine the own position of the image-recording camera at least from the structures in the environment that are respectively detected by the measuring camera, wherein the evaluation unit is further configured for locating the structures at least partially in the first image and for correcting the own position of the image-recording camera, which is determined from the second image, based on the position of the structures determined from the first image, wherein the evaluation unit is configured to correct the determined own position of the image-recording camera by searching, in the second image, for optically detectable structures, identifying the structures and carrying out an estimate of the position of the structures, whereupon the evaluation unit is configured to calculate a probable position of the structures in the first image, to search for the structures at the probable position in the first image, and to determine an actual position in the first image, whereupon the determined actual position of the structures in the first image is used by the evaluation unit for re-calculating the own position of the image-recording camera.

2. The device according to claim 1, wherein the measuring camera has a fixed focal length and an aperture angle larger than an aperture angle of the image-recording camera.

3. The device according to claim 1, wherein the image-recording camera has a fixed or a changing focal length.

4. The device according to claim 3, wherein the image-recording camera has a changing focal length and a zoom lens of the image-recording camera is calibrated such that all possible aperture angles over an entire setting range of the zoom lens and a focus are known, with the evaluation unit having access to information relating to a plurality of stored aperture angles.

5. The device according to claim 1, wherein the optically detectable structures are a plurality of markings applied in a defined manner in the environment that are characterized by color, brightness, and/or shape.

6. The device according to claim 5, wherein the plurality of markings are arranged in a plurality of defined patterns.

7. The device according to claim 1, wherein the optically detectable structures are formed by a plurality of existing parts of the environment.

8. A method for determining an own position of an image-recording camera within an environment in which a plurality of structures are optically detectable, wherein an evaluation unit calculates the own position of the image-recording camera at least from a plurality of structures in a first image of a measuring camera that is firmly mounted in a known relative position to the image-recording camera,
wherein the image-recording camera and the measuring camera are orientated such that they record at least partially a common section of the environment within which a plurality of structures are located that are optically detected by the image-recording camera in the first image and the measuring camera in a second image, and that the measuring camera transmits data relating to the first image to the evaluation unit, which determines the own position of the image-recording camera at least from the structures detected by the measuring camera in the second image, wherein the evaluation unit locates the structures at least partially also in the first image and corrects the own position of the image-recording camera, which is determined from the second image, based on the position of the structures determined from the first image,
wherein the evaluation unit is configured to correct the determined own position of the image-recording camera by searching, in the second image, for optically detectable structures, identifying the structures and carrying out an estimate of the position of the structures, whereupon the evaluation unit calculates a probable position of the structures in the first image, searches for the structures at the probable position in the first image, and determines an actual position in the first image, whereupon the determined actual position of the structures in the first image is used by the evaluation unit for re-calculating the own position of the image-recording camera.

9. The method according to claim 8, wherein the evaluation unit smoothens the second image.

10. The method according to the claim 8, wherein the evaluation unit smoothens the second image using the determined actual position of the structures in the first image for re-calculating the position of the structures in the first image.

11. The method according to claim 8, wherein a fixed position of the measuring camera relative to the image-recording camera is calibrated prior to the determination of the own position of the image-recording camera.

* * * * *